3,035,318
METHOD OF CASTING METAL IN A COATED MOLD, AND COMPOSITION AND METHOD FOR COATING THE CASTING MOLD
Erwin J. Campbell, St. Clair, Mich., assignor to Acheson Industries, Inc., Port Huron, Mich., a corporation of Michigan
No Drawing. Filed Sept. 3, 1959, Ser. No. 837,786
11 Claims. (Cl. 22—200)

This invention relates to a composition and a method for coating molds used in the casting of metals and alloys and to improved molds having an integrally bonded mold coating on at least a portion of the surface thereof.

In the metal casting art there is wide spread use of parting compositions which are conventionally refractory materials such as clays, magnesium oxide, silica flour, graphite, mica, vermiculites, etc. In the casting of certain highly chemically reactive metals such as uranium and plutonium, etc., the conventional parting compositions are unsatisfactory either because they contaminate the casting, permit the cast metal to contact the base mold material and inter-react therewith or fail to provide a clear parting between the mold and casing. It has recently been found that calcium fluoride serves as an effective parting compound for use in the casting of uranium and plutonium. However, the application of calcium fluoride to mold surfaces to obtain a uniform and adherent parting layer has presented a number of difficulties which result in the formation of castings having less than the desired purity and surface smoothness and uniformity.

It is therefore the primary object of this invention to provide an improved calcium fluoride containing composition which enables the formation on a mold surface of an adherent effective parting layer.

Another important object of this invention is to provide a calcium fluoride containing composition in dispersion form which is homogeneous and stable for long periods of time.

Another object of this invention is to provide a method of coating metal casting molds to enable the contamination-free casting of highly chemically reactive metals.

Another object of this invention is to provide an improved mold having on its surface an adherent calcium fluoride containing coating which functions effectively as a parting composition, prevents contamination of highly chemically reactive metals cast thereagainst and which imparts to the casting an improved surface smoothness and finish.

In accordance with this invention the above and related objects are realized by forming a dispersion containing calcium fluoride, a binder for the calcium fluoride and a suitable dispersing medium. Generally stated, the composition of this invention comprises, in percent by weight, about 10% to about 50% calcium fluoride, about 1% to about 20% inorganic binder, about 30% to about 89% dispersing medium. A preferred composition comprises about 25% to about 40% calcium fluoride, about 3% to about 10% binder and about 50% to about 72% dispersing medium.

The calcium fluoride which is useful for the purposes of this invention may be any of the commercially available calcium fluoride materials. In order to form more stable dispersions it is preferred that the particle size of the calcium fluoride be relatively small, for example, from 2.0 to about 10.0 microns, but larger particle sizes can be satisfactorily employed. When the larger particle size calcium fluoride is used it is desirable to increase the proportion of binder which is present in the dispersion upwardly toward the maximum indicated useful content. While the use of pure calcium fluoride is generally preferred it is satisfactory to employ a technical grade calcium fluoride and it should be understood that the purity of the calcium fluoride can be appropriately selected when the permissible degree of contamination in the casting is known.

The preferred binder of this invention and more specifically the binder which has been found to function in an improved manner when casting highly chemically reactive metals such as uranium and plutonium is an alumina sol. The best results have been obtained from an alumina sol formed from amalgamated aluminum using formic or acetic acid as a peptizing agent with temperatures substantially above 160° F. to form an alumina sol containing from about 3% to about 8%, preferably about 5 to 6% of alumina and about 2% to about 6% acid. This alumina sol is of such concentration that it will set rather quickly into a vibrant gel or jelly without dehydration or addition of electrolytes. However, alumina sols capable of quickly setting into a gel without dehydration which are formed by other conventional sol forming procedures are also satisfactory for the purposes of this invention. While the coating compositions are particularly useful in the casting of highly chemically reactive metals such as uranium, plutonium, titanium, molybdenum, tantalum, and particularly the low melting point alloys thereof, the coatings are also useful in the casting of less chemically reactive metals such, for example, as aluminum, magnesium, nickel and alloys thereof. In this case the binder may satisfactorily be sodium silicate in the same relative proportions above set forth for the inorganic binder.

In the casting of the highly chemically reactive metals it has also been found to be advantageous to incorporate a small proportion of other materials which tend to control the viscosity of the dispersion and promote the uniformity and hardness of the mold coating which is formed. A preferred composition of this type comprises:

| | Percent by weight |
|---|---|
| Calcium fluoride | 10–50 |
| Alumina sol | 1–20 |
| Calcium formate | 1–2 |
| Colloidal silica | 0.5–4 |
| Dispersing medium | 24–87.5 |

The preferred calcium formate material is the chemically pure grade. The colloidal silica produced, for example, in accordance with the teachings of U.S. Patents 2,377,841, 2,244,325 and 2,601,352 is satisfactory.

The dispersing medium is preferably water but may be an organic solvent which is compatible with the binder such as ethers, alcohols and the like. The absence of water from the dispersing medium is undesirable and in most applications it is desirable to replace only a relatively small portion of the water with an organic solvent, for example, about 5% to about 40%.

The compositions of this invention formed by suitably admixing the ingredients in conventional mixing equipment such as mullers, pebble mills and ball mills and the like. The degree of mixing is only that amount required to uniformly blend the dry and liquid ingredients to form a homogeneous dispersion. The order of addition of the ingredients in the preferred formulation is unimportant.

The compositions of this invention may be applied to the mold surface to be coated by spraying, brushing or dipping and for this purpose the compositions preferably contain about 10% to about 20% solids, by weight, of the composition. It is desirable however to formulate the compositions in more concentrated form since compositions containing higher proportions of solids than about 20% have somewhat greater stability. Concentrates containing the ingredients in the above given relative proportions and having total solids content in the range of about 30% to 70% solids represent the most preferred compositions of this invention. Such concentrates can be easily converted into a form suitable for the mold coating operation by merely adding additional dispersing medium to the concentrate prior to use. Where the composition is to be sprayed on the mold surface then more dilute solutions containing 10 to 15% solids are preferred, whereas slightly higher solids contents are more satisfactory for brushing and dip applications to the surface to be coated.

The compositions of this invention serve as effective parting materials which avoid contamination of the casting when applied to any of the conventional mold materials including, for example, cast iron, steel, stainless steel, graphite, ceramics, cermets, high melting point metals such as molybdenum and the like. After the composition is applied to the mold surface to be coated the dispersing medium is removed and this may be accomplished by air drying, forced air drying or raised temperature drying at a temperature of about 180° F. to 300° F. Molds which have been coated with the composition of this invention by a single spray application are useful but it is normally desirable to have slightly thicker coatings. Such thicker coatings can be obtained by multiple applications of the coating composition to the surface separated by intermediate air drying or forced air drying steps. Typically suitable mold coating surface thicknesses are in the range of about 0.1 mil to about 1.0 mil.

The compositions and method of forming mold coatings therewith are illustrated in greater detail in the examples which follow, but it is to be understood that the examples merely typify and do not set forth the definitive limits of the invention which have been set forth herein above.

*Example I*

A mold coating composition was formulated by adding to a pebble mill the following constituents:

| | Percent by weight |
|---|---|
| Calcium fluoride | 34 |
| Alumina sol | 6 |
| Calcium formate | 1 |
| Colloidal silica | 0.6 |
| Water | 58.4 |

The ingredients were mixed in the pebble mill for approximately 24 hours at the end of which time a uniform dispersion was removed from the mill. The calcium fluoride was powdered reagent grade. The calcium formate was the chemically pure grade. The colloidal silica was produced in accordance with the process of U.S. Patent 2,377,841. The resulting dispersion contained about 42% solids and prior to application to the surface of a cast iron mold was diluted with water to compositions containing 15–20% solids. These diluted compositions were sprayed on the surface of cast iron molds and the water removed therefrom by drying in air at 200° F.–220° F.

The adhesion of the dried coating is enhanced by adding to the diluted mold composition slightly prior to the actual coating operation about 1% to about 10% by weight of phosphoric acid. Such a modification is exemplified in Example II.

*Example II*

A dispersion was prepared by combining 37% by weight of the dispersion of Example I with 5% phosphoric acid (85%) and 58% water. This dispersion was then applied to the surface of a cast iron mold to produce a coating thickness of about 0.3 mil in a plurality of separate passes with intermediate drying. The water was removed by heating in air at 200° F.–220° F. and an inspection of the mold surface showed the surface to be coated with an adherent uniform surface layer.

Plutonium cast into the molds of Examples I and II produced castings which were free of contamination from the mold coating composition and cast iron and which had a smoother surface than similar castings from similar shaped molds which were preliminarily dusted with calcium fluoride in powder form.

This dispersion was also applied to the inner surfaces of graphite and sintered ceramic molds and similar results were obtained upon casting plutonium therein.

When the coating compositions are modified to include 1% to 10% phosphoric acid the compositions comprise:

| | Percent by weight |
|---|---|
| Calcium fluoride | 9–45 |
| Alumina sol | 0.9–18 |
| Phosphoric acid | 1–10 |
| Water | 27–80 |

What is claimed is:

1. A composition comprising a dispersion containing about 10% to about 50%, by weight, calcium fluoride, about 1% to about 20% of an inorganic binder selected from the group consisting of alumina sol, sodium silicate, and alumina sol modified with colloidal silica and calcium formate and about 30% to about 87% of a compatible dispersing medium comprising water.

2. A composition in accordance with claim 1 wherein the solids content is in the range of about 10% to about 20%, by weight, of the total composition.

3. A composition comprising a dispersion containing about 25% to about 40%, by weight, calcium fluoride, about 3% to about 10% of an inorganic binder selected from the group consisting of alumina sol, sodium silicate, and alumina sol modified with colloidal silica and calcium formate and about 50% to about 72% of a compatible dispersing medium comprising water.

4. A composition comprising a dispersion containing about 10% to about 50%, by weight, calcium fluoride, about 1% to about 20% alumina sol and about 30% to about 89% water.

5. A concentrate for use in forming a mold coating in dispersion form which comprises about 10% to about 50% calcium fluoride, about 1% to about 20% alumina sol, about 30% to about 89% of a compatible dispersing medium comprising water, said concentrate containing about 30% to about 70% solids based on the total weight of the concentrate.

6. A dispersion for use in coating metal casting molds comprising, in percent by weight, about 10% to about 50% calcium fluoride, about 1% to about 20% alumina sol, about 1% to about 2% calcium formate, about 0.5% to about 4% colloidal silica and about 24.0% to about 87.5% of a compatible dispersing medium comprising water.

7. A composition as claimed in claim 6 wherein said dispersing medium is water.

8. A method for coating metal casting molds which comprises the steps of applying to the mold surface a composition comprising about 10% to about 50% calcium fluoride, about 1% to about 20% of an inorganic binder selected from the group consisting of alumina sol, sodium silicate, and alumina sol modified with colloidal silica and calcium formate and about 30% to about 89% of a compatible dispersing medium comprising water to form a continuous coating thereon and removing said dispersing medium therefrom.

9. A method for coating metal casting molds which comprises the steps of applying to the mold surface a composition comprising about 10% to about 50% calcium fluoride, about 1% to about 20% of an inorganic binder selected from the group consisting of alumina sol, sodium silicate, and alumina sol modified with colloidal silica and calcium formate and about 30% to about 89% of a compatible dispersing medium comprising water to form a continuous coating thereon and drying the coating to remove the said dispersing medium and thus form an adherent coating on said surface.

10. A method for coating metal casting molds which comprises the steps of applying to the mold surface a composition comprising, in percent by weight, about 10% to about 50% calcium fluoride, about 1% to about 20% alumina sol, about 1% to about 2% calcium formate, about 0.5% to about 4% colloidal silica and about 24.0% to about 87.5% of a compatible dispersing medium comprising water and drying the coating to remove the said dispersing medium and thus form an adherent coating on said surface.

11. A method of casting highly chemically reactive metals which comprise the steps of preparing a coating composition containing about 9.0% to about 45% calcium fluoride, about 0.9% to about 19% alumina sol, about 1% to about 10% phosphoric acid, about 27% to about 80% water, applying said coating composition to a mold surface to form a uniform coating thereon, removing water from said coating on said surface and thereafter casting a highly chemically reactive metal on said mold.

References Cited in the file of this patent

UNITED STATES PATENTS 2,835,608    Kanter               May 20, 1958